June 29, 1954 E. BENNINGER 2,682,371
PIN CARRIAGE SHIFTING MECHANISM FOR
TEN-KEY MULTIPLYING MACHINES
Filed Sept. 7, 1950 4 Sheets-Sheet 1
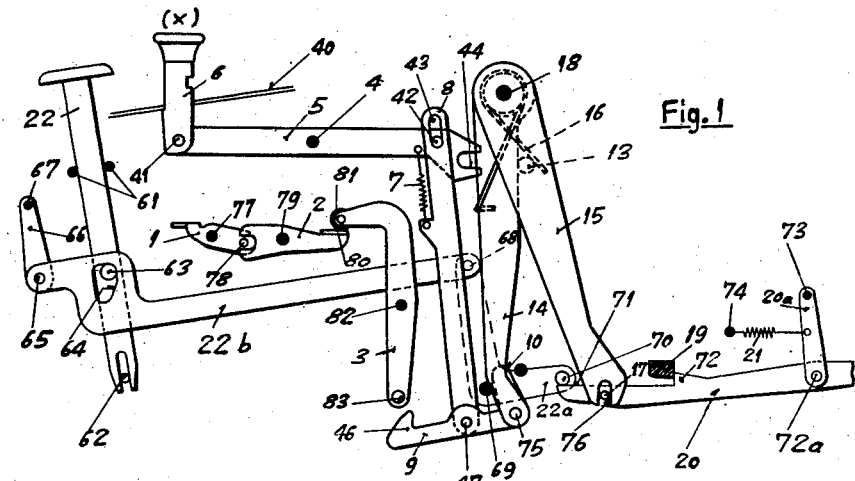
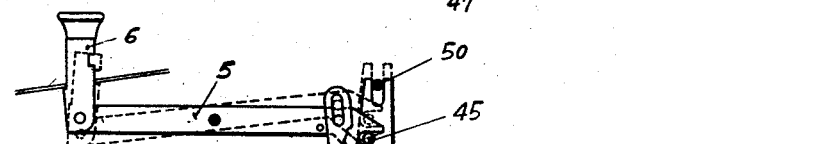
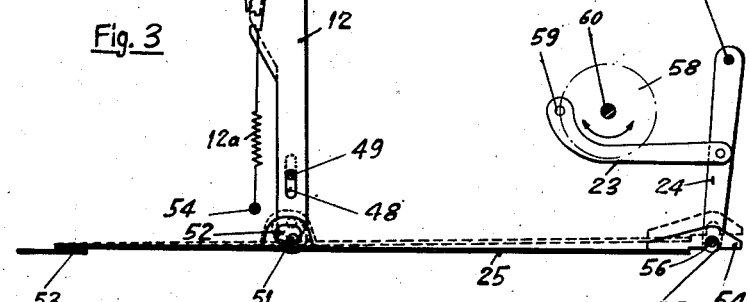
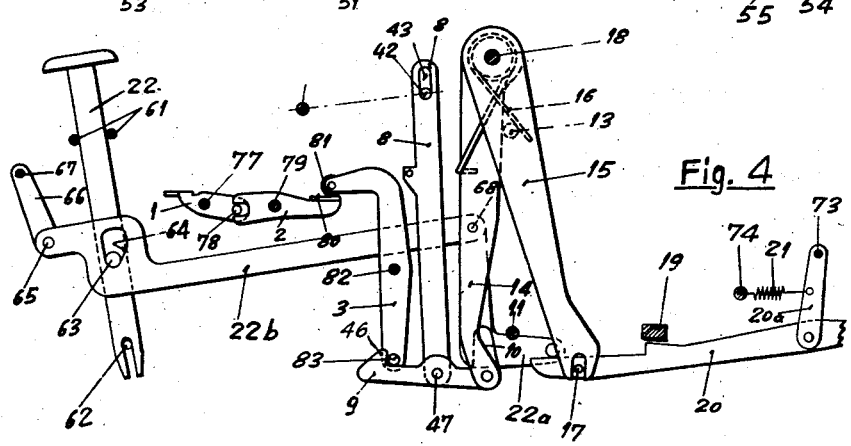

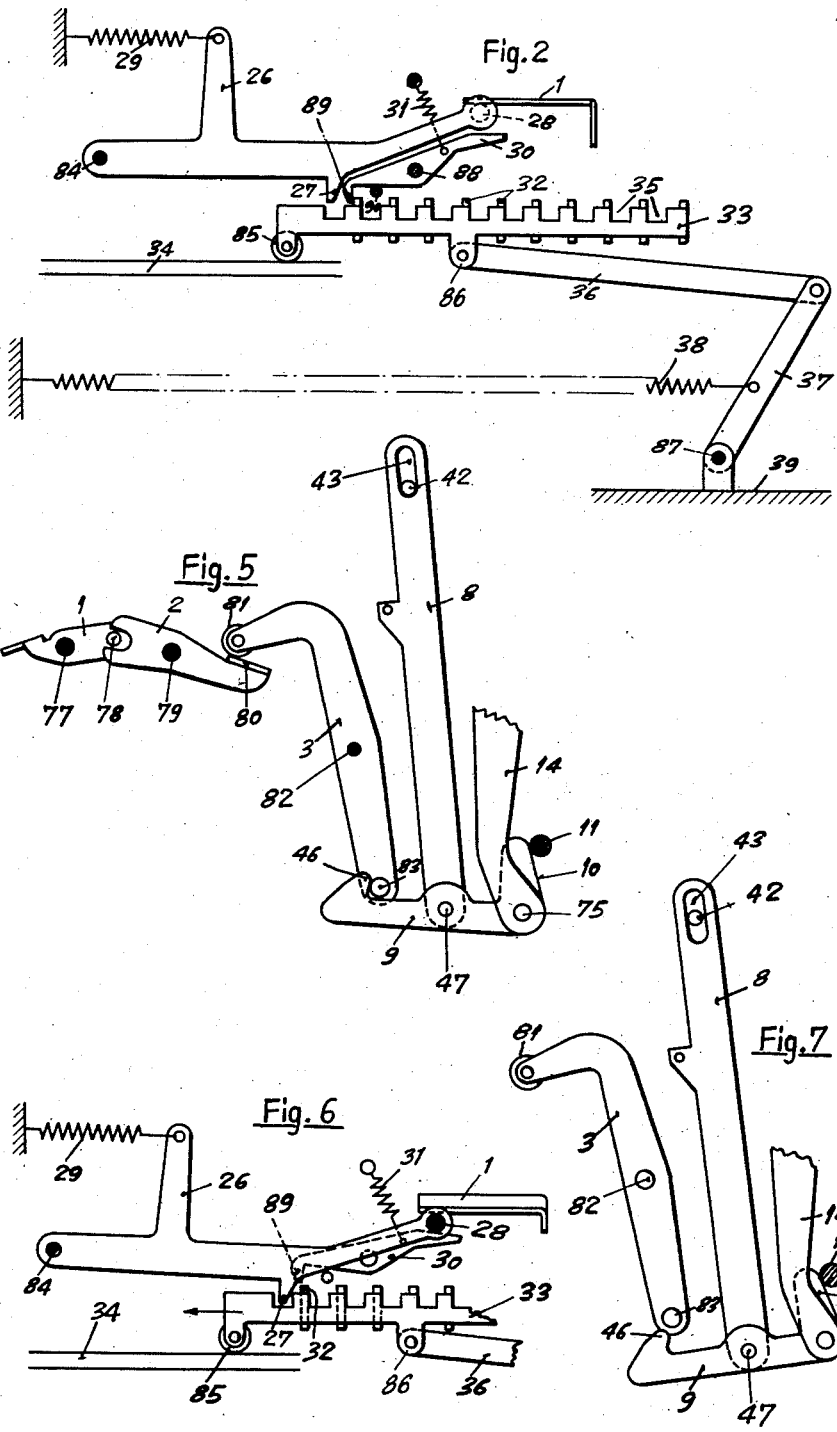

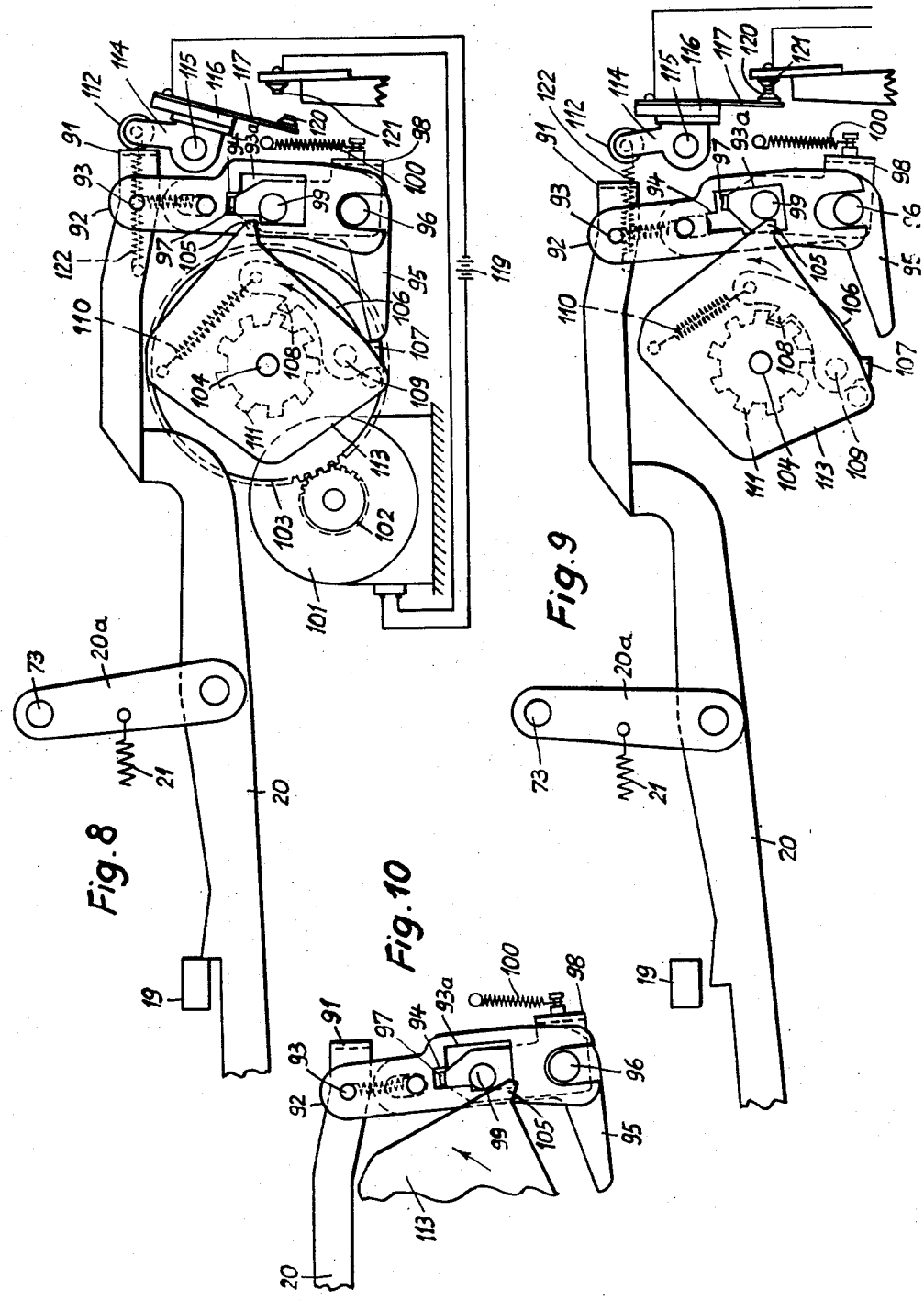

June 29, 1954
E. BENNINGER
2,682,371
PIN CARRIAGE SHIFTING MECHANISM FOR
TEN-KEY MULTIPLYING MACHINES
Filed Sept. 7, 1950
4 Sheets-Sheet 4
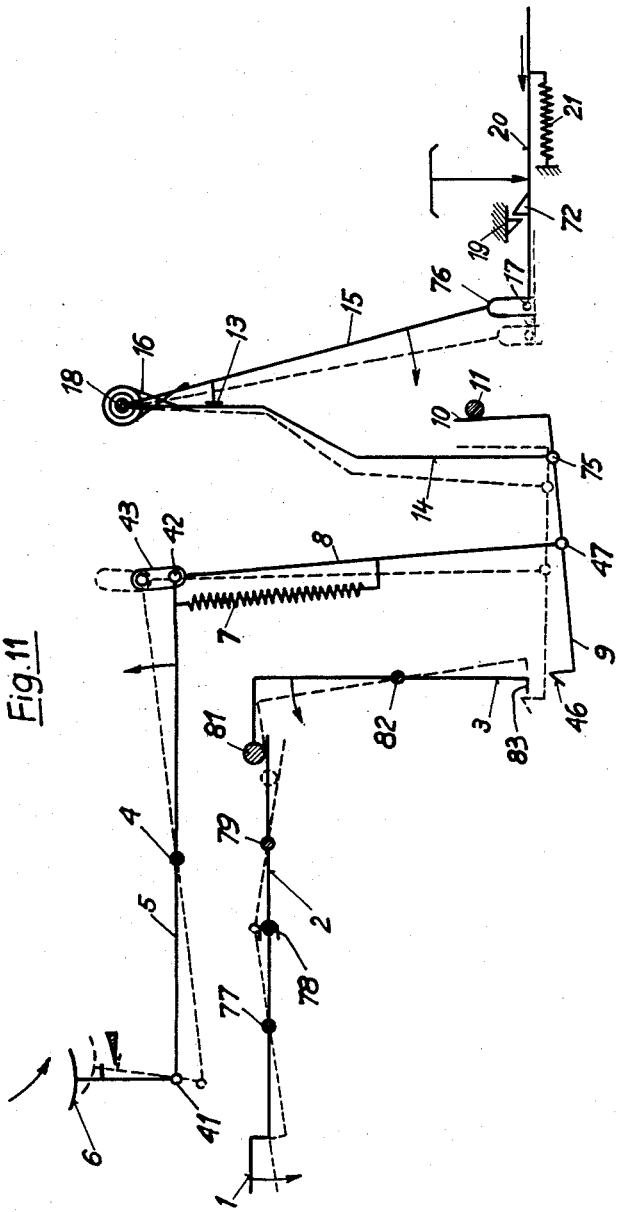

Patented June 29, 1954

2,682,371

UNITED STATES PATENT OFFICE 2,682,371

PIN CARRIAGE SHIFTING MECHANISM FOR TEN-KEY MULTIPLYING MACHINES

Eugen Benninger, Zurich, Switzerland, assignor to Precisa A. G. Rechenmaschinenfabrik, Zurich, Switzerland Application September 7, 1950, Serial No. 183,514

2 Claims. (Cl. 235—63)

In conventional ten-key calculating machines with motor drive and a carriage movable step by step, multiplying is accomplished in the following manner: After the machine has been adjusted for multiplication and the multiplicand has been set, the motor key will be depressed and held down until the machine has made a number of revolutions corresponding to the partial multiplier. Then the motor key will be released and the 0-key depressed, so that the carriage can move forward by one digit for the next partial multiplication. If, for example, the number 725 is to multiplied by 23, the machine will be adjusted for multiplication by depressing the multiplication key and fixing it in the depressed position, whereupon the multiplicand 725 will be set in the machine and the motor key will be depressed. Corresponding to the partial multiplier 3, the motor key will be released after the machine has made three turns. Then the 0-key will be depressed, thereby to move the carriage one digit. Thereupon the motor key will again be depressed, but will now be released after the machine has made two turns according to the partial multiplier 2.

Other machines are known which are provided with an accessory multiplying apparatus, wherein the multiplier is each time adjusted by means of a pointer shifted into one position after the other. Likewise there are machines with a row of multiplying keys 1 to 9, and also machines in which multiplicand and multiplier are set by means of the same keyboard.

With all these machines a loss of time is entailed and their complicated mechanisms are very expensive and take up an unnecessary amount of space. Contrary thereto in the improved machine according to the present invention, multiplying is done with the already existing addition motor key, whereby the production is simplified and the operation of the machine is speeded up. Each machine has its operating rhythm, which is felt in the finger when depressing the key, and the counting can be automatically done by the operation without glancing at the machine. The changing of the movement of the carriage is caused with the aid of the X key in advance and each time when the addition motor key is released.

One preferred embodiment of the invention is illustrated by way of example in the accompanying diagrammatical drawing in which:

Fig. 1 shows the keys and linkage thereof with the control lever of the current switch in the position of rest;

Fig. 2 is a front elevation of the pin carriage and part of its drive;

Fig. 3 is a side elevation of the multiplication key and its connection with the release linkage;

Fig. 4 shows the major portion of the parts of Fig. 1 with the motor key depressed;

Figs. 5 and 6 show the release linkage and the pin carriage with its catches, respectively, when the motor key is released;

Fig. 7 is a side elevation of the operating catch with coordinate parts in disengaged position;

Figs. 8 to 10 show the motor switch and the parts controlling it in different positions; and Fig. 11 is a schematical illustration of the device according to the invention, for the purpose of facilitating the understanding of the operation of the parts.

The multiplication key (X key) is guided vertically movable in the keyboard plate 40. The lower end of that key is pivotally connected by a pin 41 to an intermediate lever 5. The lever 5 can turn on a shaft 4 which is rigidly fixed in the machine casing (not shown). The opposite end of the lever 5 engages with a pin 42 into a slot 43 in the suspension bar 8. In addition, the two parts 5 and 8 are connected to each other by a spring 7 which tends to pull the bar 8 up against the pin 42. The righthand end (Fig. 1) of the lever 5 is recessed at 44 and engages a pin 45 (Fig. 3) which is fixed to the releaser 12. An operating catch 9 is pivoted by means of a pin 47 to the lower end of bar 8. Catch 9 has a nose 46 at its front end and another nose 10 at its rear end. The parts 9, 46 and 10 form one solid piece.

The releaser 12 is guided by a pin 49 engaging a slot 48 in the releaser and by a pin 50 engaging its upper fork-shaped end. A spring 12a attached with its one end to a third pin 54 and with its other end to the releaser tends to pull the latter downwards so that the upper end of the slot 48 is urged against the pin 49. The three pins 49, 50 and 54 are fixed to the wall of the casing. The lower end of the releaser 12 is provided with a pin 51 engaging in an oval opening 52 of a connecting bar 25. This latter is supported with play at 53 so that it can swing out into the dotted position (Fig. 3). At the rear end the connecting bar 25 forms cheeks which are bent vertically upwards and provided with a recess 55. A pin 56 on a rocker bar 24 engages the recess 55. A connecting bar 23 is pivotally connected to bar 24 and jointed to a disc 58 at 59. This disc 58 is mounted on the main shaft 60 of the machine, which performs a reciprocating movement in the conventional manner.

The motor key 22 is so guided by pins 61 and 62 that it can be moved downwards. A pin 63 on the motor key 22 engages in a slot 64 of the push bar 22b the front end of which is pivotally connected to the swinging bar 66 by the rivet 65. This bar 66 is rotatably mounted on a cross shaft 67 of the casing. The rear end of the push bar 22b is pivotally connected to a bell-crank lever 22a by means of a rivet 68. This bell-crank lever can swing on a cross shaft 69 of the machine and carries at the other end a fixed pin 70 which lies on a surface 71 of the control lever 20. The latter rests with a nose 72 against a fixed stop 19 of the casing. The control lever 20 is suspended at 72a on a swinging bar 20a which is pivotally supported on a cross shaft 73 of the casing. The bar 20a is pulled forwards by a spring 21 which is fixed to a cross pin 74 of the casing. The reciprocable element or control lever 20 serves for switching current on and off and for engaging and disengaging the motor clutch.

To this end the control lever 20 cooperates with the device represented in Figures 8, 9 and 10 of the drawings.

The rear end 91 of the control lever 20 is coupled to a locking slide 92 by means of a pin 93. The slide 92 is provided with an opening 93a of approximately rectangular shape having a narrower part 94. The lower end of the slide 92 is guides on a lever 95 for longitudinal movement. This lever is rotatably mounted on a bolt 96. The opening 93a of the slide 92 cooperates with a projection 97 entering the said opening or its narrower part 94. The projection 97 is a part of a latch 98 which is provided with a roller 99 and is acted upon by a spring 100 urging the latch 98 to move in anti-clockwise direction about the bolt 96.

The shaft of the motor 101 of the calculating machine bears a toothed wheel 102 which engages another toothed wheel 103 of greater diameter. A notched sleeve 111 is secured by means not shown to the shaft 104 of the wheel 103 so that wheel 103, shaft 104 and sleeve 111 can be turned together by motor 101 via wheel 102 in an anti-clockwise direction as indicated in Figs. 8 and 9. A cam plate 113 provided with a crest 105 for cooperation with the roller 99 of the latch 98 is freely rotatable on shaft 104. A dog 106 is pivoted on a pin 109 secured to plate 113. A spring 110 attached with its ends to the plate and the dog, respectively, tends to turn the latter so that a projection 108 of the dog will engage a notch of the sleeve 111, thereby to couple the plate 113 to the wheel 103. However, with the parts in the position of Fig. 8, the free arm of the lever 95 projects in the path of another projection 107 of the dog 106. In consequence, when lever 95 is turned into the position of Fig. 8 while plate 113 rotates, projection 107 will be stopped so as to turn the dog 106 against the restraint of spring 110 and to disengage projection 108 from the sleeve 111. The plate 113 drives in a manner known per se the elements actuating the setting mechanism of the calculating machine. Neither these elements nor the said mechanism are shown and described as they do not form a part of the present invention.

A roller 112 cooperating with the end 91 of the control lever 20 is mounted on a double-armed lever 114 rotatably mounted on a pin 115. A layer 116 of insulating material is fastened to the lever 114 and a metallic contact blade 117 is secured to the said layer. One end of the blade 117 is connected to one pole of a battery 119 whereas the other end bears a contact 120 adapted to cooperate with a fixed contact 121 connected to the motor 101 and therewith to the other pole of the battery 119.

To the rear end of the above-mentioned catch 9, the swinging lever 14 is jointed by means of a rivet 75 as shown in Fig. 1. Lever 14 and another swinging lever 15 are freely rotatable on a cross shaft 18. The lower end of lever 15 embraces with a slot 76 a pin 17 of the control lever 20. The two levers 14, 15 are coupled to each other by a bent spring 16. One end of this bent spring lies against the lever 14, whilst its other end and also the lever 14 rest against the pin 13, which is fixed on the lever 15. The spring 16 tends to urge the two levers 14, 15 against each other and thereby to eliminate any inaccuracies which may have occurred in the course of manufacture.

The release lever 1 is rotatably mounted on a cross shaft 77 of the keyboard. The front end of the lever 1 acts on the vertical control catch 26 in order to move the carriage. The rear end of the release lever 1 is provided with a pin 78 which engages with the forklike end of the intermediate lever 2. The intermediate lever 2 is pivotally supported on the shaft 79 and provided with a downwardly bent lug 80 at its rear end. A roller 81 lies against the surface thus formed and is rotatably arranged on the upper end of the releaser 3. The releaser 3 is pivotally mounted on a shaft 82 and has at the lower end a pin 83 cooperating with the catch 9 in a way to be described hereinafter.

The above-mentioned control catch 26 (Fig. 2) is pivotally mounted on a cross shaft 84 which is rigidly fixed in the keyboard. A tension spring 29, one end of which is connected to the keyboard, tends to keep the vertical control catch in the raised position, i. e. as shown in Fig. 2. The front end of the release lever 1 bears on a pin 28 secured to and extending laterally from the vertical control catch 26. A nose 27 of the catch 26 can engage in the notches 35 of the rack of a pin carriage 33 which is provided with selecting pins 32 and slides with a roller 85 on the rail 34. Such pin carriage is fully described in my U. S. Patent Number 2,062,963 and designated therein with the reference character 10.

As it is well known in the art these selecting pins 32 are slidingly arranged in ten parallel rows corresponding to the values 0, 1, 2, 3, 4, 5, 6, 7, 8 and 9. In Figures 2 and 6 which show the carriage 33 in elevation, only the first row of selecting pins corresponding to the value "0" can be seen. A connecting bar 36 is jointed with its one end to a lug 86 of the carriage 33, and with its other end to a swinging lever 37 mounted on a shaft 87, which is carried by the baseplate 39 of the machine. A spring 38 tends to pull the lever 37, and therefore also the carriage 33, to the left hand side in Fig. 2.

An escapement pawl 30 can swing on the cross shaft 88 and engages with the nose 89 on the row "0" of the pin carriage 33. The catch is pulled counterclockwise by a spring 31 so that it comes to rest on the stop-pin 90.

The machine operates as follows:

When the X key 6 is depressed from the normal position shown in Figure 1 into the position shown in dotted lines in Figure 3 the releaser 12 with the connecting bar 25 is raised from the pin 56 of the swinging bar 24. The mentioned bar 24 is an element of the control mechanism for returning the pin carriage 33 which is not a part of the present invention and, therefore, not further described herein. A description of a suitable mechanism for the mentioned purpose is given in my Swiss Patent Number 237,427 of April 30, 1945. The connecting bar 23 can now be moved by the disc 58 on main shaft 60 and rock the bar 24 without carrying the connecting bar 25 along. Further, when the X-key 6 is depressed, the tension spring 7 is stretched and it thereby becomes possible for the suspension bar 8 to rise. After this operation the figure-keys of the multiplicand can be depressed. It is also allowable to set the multiplicand on the machine before the X key 6 is depressed.

After the foregoing manipulations the motor key 22 (Fig. 4) will be depressed. Thereby the control lever 20 will be disengaged from the stop 19 and will take the position of Fig. 4 owing to the tension spring 21. Thereby pin 17 of lever 20 will turn the levers 15 and 14 about their pivot 18. In consequence, the nose 10 of the operating catch 9 moves away from the stop 11. At the same time the suspension bar 8 can rise so far that the operating catch 9 engages the pin 83 of the releaser 3.

The last-described position is maintained until the motor key is released. Then the control lever 20 is brought back into its position of rest. Necessarily the levers 15 and 14 connected by the bent spring 16 must move with it.

The movement of the control lever 20 is effected by the mechanism represented in the Figures 8 to 10. When the key 22 is depressed the control lever 20 moves from the position of Figure 1 into that shown in Figure 4 as hereinbefore described. Consequently the end 91 of the control lever 20 moves also to the left (Figures 8 and 9). A spring 122 interconnecting the control lever 20 with the lever 114 rotates the latter in a counterclockwise direction until the contacts 120, 121 rest on each other. The electric circuit of the battery 119 is closed and the motor 101 begins to drive the wheels 102, 103 and the notched sleeve 111.

The movement of the control lever 20 to the left (Figures 8 and 9) entails a rotation of the locking slide 92 about the bolt 96, about which the lever 95 guiding the slide 92 is rotatably mounted. As the control lever 20 is suspended on the arm 20a its movement into the position shown in Figure 9 raises the slide 92 sufficiently to allow the projection 97 to leave the narrow part 94 of the opening 93a and to enter the larger part of the latter. The same movement of the slide 92 brings about the release of the nose or projection 107 from the lever 95 so that projection 108 of the dog 106 may enter in a notch of the sleeve 111 owing to the tension of spring 110. In consequence the plate 113 can be taken along by the notched sleeve 111, and the crest 105 can pass the roller 99 by pushing it aside in the opening 93a and, thus, turning the latch 98 about the bolt 96 as shown in Fig. 9. The setting mechanism is thereby actuated and this situation remains as long as the key 22 is maintained in its depressed position. When the key 22 is released the control lever 20 will turn with its end 91 slightly downward until its other end portion comes to bear against the stop 19. Thereby the slide 92 will drop a little distance. This small movement is sufficient to allow the projection 97 to enter the part 94 of the opening 93a where the projection 97 has no lateral clearance. This position is shown in Fig. 10. When now the rotation of the plate continues the crest 105 will engage the roller 99 which is in its path and will urge the roller towards the right side in Fig. 10. As roller 99 is secured to the latch 98 and the latch is locked to the member 92 owing to the engagement of the projection 97 in the recess 94, the latch 98 together with the member 92 and lever 95 will be turned about the pivot 96 in a clockwise direction with the result that the control lever 20 will be shifted to the right hand side in the position of Fig. 8 so as to bear with its end 91 against the roller 112 and to open the contact between the points 120 and 121. Simultaneously, the end of lever 95 turned into the path of the dog projection 107 will stop the rotation of the plate 113 when the projection 107 engages the lever. Thereby the projection 108 will be lifted from the notched sleeve so that the motor can decelerate and finally stop.

The operating catch 9 takes the releaser 3 along by turning it about the pin 82 until the nose 10 of catch 9 comes to bear against the stop 11 (Fig. 5). Continued movement of the point 75 to the right hand side in Fig. 5 will cause the catch 9 to turn about that point and to lower the suspension bar 8 with the pivot 47. In consequence, the catch 9 turns also about pivot 47 with respect to the bar 8. Owing to this movement of the catch 9, the nose 46 will release the pin 83 of the releaser 3 (Fig. 7) which thus can return to its original position.

Before this occurs, the turning of the releaser 3 about its pivot at 82 causes roller 82 to depress the end 80 of the intermediate lever 2 whereby the release lever 1 will be turned into the position of Fig. 5 so as to urge the pin 28 downwards (Fig. 6). In consequence, the nose 89 of the escapement pawl 30 will be lifted from the first pin 32 of the "0"-row and the pin carriage 33 will be pulled to the left by the spring 38 (Fig. 2) via the rocker 37 and connecting bar 36. But since the vertical control catch 26 is also pressed down by the release lever 1, and thus the nose 27 engages in the first notch (later in the second, then in the third, and so on), the carriage will be locked step by step (Fig. 6).

As soon then as the operating catch 9 releases the releaser 3 (Fig. 7) and the release lever 1 is raised, the escapement pawl 30 will be immediately returned by spring 31 to its locking position in which it can engage the next stop 32 whereas spring 29 will restore the vertical catch 26 to its inoperative position of Fig. 2 so as to allow carriage 33 to move to the left by one step or by one notch 35.

What I claim is:

1. In a ten-key motor driven calculating machine including a main clutch, a shiftable pin carriage, a multiplication key, a motor key, a reciprocable element movable from an inoperative to operative position in response to depression of the motor key to connect the motor to a source of current and to engage the clutch, an escapement mechanism for tabulating said pin carriage, and a lever operable to actuate the escapement mechanism and thereby to control the carriage movement, the combination of a catch having one end hook-shaped and including a pivot at its other end, a first member pivoted at one end to the stationary machine frame and connected at its free end to said pivot and to said element, a spring connected to said element and tending to urge it into its operative position, an abutment engageable by said element to normally hold it in inoperative position against the urgency of said spring, a second member linked at one end to said multiplication key and at its other end to said catch intermediate said hook and said pivot, whereby upon a depression of said multiplication key said catch will be free to turn about its pivot into a position for engagement with said lever, a linkage connection between said motor key and said element to release it from said abutment upon depression of said motor key, thereby turning said first member to translate and engage said hook with said lever, a second abutment engageable by said catch at the end of its return movement to inoperative position to cause said catch to release said lever, and means responsive to an initial movement of said element, upon the release of said motor key from depressed position, to return said element to its inoperative position.

2. A device as claimed in claim 1, said first member including two arms rotatable about said stationary pivot, the free end of one of said arms being linked to said element, the free end of said other arm being connected to said catch pivot, and a second spring coupling said arms.

References Cited in the file of this patent

UNITED STATES PATENTS

| Number | Name | Date |
|---|---|---|
| 2,397,745 | Kiel | Apr. 2, 1946 |
| 2,398,286 | Carlstrom et al. | Apr. 9, 1946 |